UNITED STATES PATENT OFFICE 2,489,671

OIL COMPOSITIONS

Anthony J. Revukas, Cranford, N. J., assignor to Tide Water Associated Oil Company, Bayonne, N. J., a corporation of Delaware No Drawing. Application January 15, 1947, Serial No. 722,289

8 Claims. (Cl. 252—51.5)

The present invention relates to oil compositions, and, more particularly, to lubricating oil compositions containing an oil in major proportion, a minor proportion of an oil-soluble polymerized ester of the acrylic series, and a minor amount of a tertiary amine.

Oil soluble, polymerized esters of the acrylic series are known to be valuable additives for oils to impart certain desired characteristics thereto, as for example, to depress the pour point, to improve viscosity index, to maintain lubricating surfaces substantially free of undesirable gum or other deposits, and the like. However, although incorporation of such additives in oils imparts certain desirable properties thereto, under some conditions, as for example wherein water or steam can come into contact with the additive-containing oil, the polymerized esters of the acrylic series tend to induce emulsification, thus interfering with the performance efficiency of the oil compositions.

It is an object of the present invention to provide improved oil compositions, containing polymerized esters of the acrylic series, that are endued with emulsification-suppressing characteristics while at the same time retaining the beneficial properties imparted thereto by such polymerized esters.

Generally speaking, the oil compositions particularly adapted for treatment in accordance with the present invention are mineral oils containing polymeric esters of the acrylic series, such esters generally having the following basic structure:

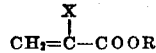

wherein X represents a hydrogen atom or an alkyl group, e. g., a methyl group, and R is a monovalent hydrocarbon radical. In general, when employing such polymers in oils, and the simple esters are used, R preferably contains more than four carbon atoms as use of radicals containing such a relatively high number of carbon atoms usually provides improved solubility of the polymers in oils. Hence, particularly suitable polymers of the simple esters include those of the foregoing structural formula wherein R contains at least four and preferably from eight to eighteen carbon atoms. Typical examples of such polymers of the acrylic series that are employed in oil compositions include amyl, hexyl, cyclohexyl, decyl, cetyl, octadecyl and the like, esters, of acrylic or α-methacrylic acids. Furthermore, mixtures of such polymers may likewise be used. In addition to the polymers of the simple esters, as hereinbefore discussed, their copolymers may also be used. In general, such adjuvants preferably comprise copolymers of esters having an alcohol group of not more than five carbon atoms and of esters derived from an alcohol group of at least five carbon atoms, as such copolymers generally have improved solubility characteristics in oils. The amount of polymeric esters of the acrylic series incorporated into oils may be varied depending on several factors, as for example, the type of oil and the particular polymeric esters used, the solubility of the polymers in the oil, and the like, but for most purposes the amount of polymeric esters used generally varies from about 0.1% to about 5% based upon the weight of the oil.

The present invention is based upon the discovery that certain amines are effective-emulsification suppressants or oils containing polymerized esters of the acrylic series that are susceptible to emulsification by water, e. g., steam and moisture. In broad aspect, the amines that have been found to impart demulsification characteristics to such oil compositions are substantially water-insoluble, tertiary amines soluble in oils, as for example, trialkyl amines such as triamyl amine, tertiary aralkyl alkyl amines, and the like. With reference to the tertiary aralkyl alkyl amines, particularly suitable examples thereof as embodied herein are illustrated by the following formula:

wherein $R^1$ and $R^2$ are the same or different hydrocarbon groups, $R^3$ and $R^4$ are radicals selected from the groups consisting of hydrogen and alkyl radicals, and A is a phenol grouping having at least one hydrocarbon substituent for a nuclear hydrogen atom. In a more preferred embodiment, the present invention is concerned with the use of phenylolmethyl dialkyl amines having the formula:

wherein $R^1$ and $R^2$ are the same or different hydrocarbon groups containing a sum of more than six carbon atoms, and A represents a phenylol grouping containing at least one hydrocarbon substituent for a nuclear hydrogen atom. Suitable examples of demulsifying agents falling within the more preferred embodiment of the present invention are the dialkyl aminomethyl phenols typified by the cardanylolmethyl dialkyl amines, e. g., diamylaminomethyl cardanol, dibutylaminomethyl cardanol, dilaurylaminomethyl cardanol, di-2-ethylhexylaminomethyl cardanol, and the like, as well as other teritary aralkyl alkyl amines including diamylaminomethyl para tert.-amyl phenol, diamylaminomethyl 2, 4-diamyl phenol, pentadecylphenylolmethyl diamylamine, and the like.

In order to further describe my invention, and to illustrate certain embodiments thereof, several examples are set forth hereinafter showing the effective demulsification properties imparted by the tertiary amines embodied herein when incorporated into oils, containing oil-soluble polymerized esters of the acrylic series having a tendency to emulsify with water. In each of the examples, the procedure employed for determining demulsification characteristics was in accordance with the following "Test procedure A."

Test procedure A

The apparatus employed comprises a motor-driven mixer, a 100 ml. graduate, and a constant temperature bath.

Eighty ml. of the test composition consisting of 40 ml. of test oil and 40 ml. of distilled water are poured into the graduate and heated to a temperature of about 130° F. The test composition is then stirred for 5 minutes at 1500 revolutions per minute while maintaining the composition at 130° F. whereby the mixture is emulsified. After the 5 minute stirring is completed, the emulsified composition is maintained at 130° F. without additional agitation. The test composition is observed at 5 minute intervals up to a 60-minute period. At each interval, it is noted whether the emulsion has been completely separated into a layer of water and a layer of oil, or whether an oil-water emulsion is still present. If the emulsion has not been completely broken, the amount that is present is recorded as "milliliters of cuff" at the 30 minute and 60 minute readings. When emulsion is present, the test composition comprises a bottom layer of water, a top layer of oil and an intermediate layer of emulsion which is recorded as "milliliters of cuff."

Example I

A test composition was prepared containing about 98% by weight of an oil having a viscosity of about 195 Saybolt Universal seconds at 100° F., a viscosity index of about 86, and an A. P. I. gravity of 27.6 and about 2% by weight of Acryloid 150, a composition comprising about 40% by weight of a copolymer type resin of methacrylic acid esters, in which one of the alcohol components is lauryl alcohol, dissolved in 60% by weight of a 0° F. pour point, 1½ color, 420° F. flash point Mid-Continent neutral oil. When tested in accordance with procedure A, at least 42 ml. of the original 80 ml. of test composition were present in emulsified form at the 30-minute reading, the high degree of emulsification being induced by the polymeric ester. However, by adding either 0.1 or 0.2% of diamylaminomethyl cardanol, based on the weight of oil, to the foregoing copolymer-containing oil composition, and subjecting the resulting solution to the conditions of test procedure A, substantially complete separation of water from oil was obtained within 30 minutes.

Example II

A test composition was prepared containing about 97% by weight of 300 S. U. S. grade turbine oil and about 3% of the coplymer additive employed in Example I. When tested in accordance with procedure A, at least 67 ml. of the original 80 ml. of test composition were present in emulsified form at the 30-minute reading, the high degree of emulsification being induced by the polymeric ester. However, by adding either 0.1 or 0.2% of diamylaminomethyl cardanol, based on the weight of oil, to the foregoing copolymer-containing oil composition and subjecting the resulting solution to the conditions of test procedure A, substantially complete separation of water from oil was obtained within 30 minutes.

Example III

A test composition was prepared containing 97% by weight of a lubricating oil having a viscosity of 316.2 S. U. S. at 100° F., a viscosity of 82.2 and an A. P. I. gravity of 27.5 and 3% of a copolymer-containing additive similar to that used in Example I. When tested in accordance with procedure A, at least 51 ml. of the original 80 ml. of test composition were present in emulsified form at the 30-minute reading, the high degree of emulsification being induced by the polymeric ester. However, by adding either 0.1 or 0.2% of diamylaminomethyl cardanol, based on the weight of oil, to the foregoing copolymer-containing oil composition and subjecting the resulting solution to the conditions of test procedure A, substantially complete separation of water from oil was obtained within 30 minutes.

Example IV

An oil of turbine lubricating grade was subjected to test in accordance with procedure A and the emulsion formed was completely resolved in 4 minutes. A test composition was then prepared containing 97% by weight of the same lubricating oil and 3% of a copolymer-containing additive similar to that used in Example I. When tested in accordance with procedure A, 54 ml., and 47 ml. of emulsion were present out of the original 80 ml. of test solution at the 30 and 60 minute readings respectively demonstrating that emulsification was induced by the polymeric ester of the acrylic series. However, by adding 0.1% of triamylamine, based on the weight of oil, to the foregoing copolymer-containing oil composition and subjecting the resulting solution to the conditions of procedure A, substantially complete separation of water from the oil was obtained in 23 minutes.

As stated hereinbefore, a preferred embodiment of the present invention includes the use of tertiary aralkyl alkyl amines falling within the following formula as emulsification suppressing additives for oils containing polymerized esters of the acrylic series which tend to induce emulsification:

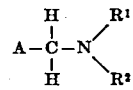

wherein $R^1$ and $R^2$ are the same or different hydrocarbon groups containing a sum of more than six carbon atoms, and A represents a phenol grouping containing at least one hydrocarbon substituent for a nuclear hydrogen atom, as such amines are generally characterized by having suitable oil-solubility and substantially water-insoluble properties. As an example, diamylaminomethyl cardanol, hereinbefore set forth in the examples, is a particularly suitable demulsification additive falling within the preferred embodiment as is evidenced by the efficient demulsification characteristics imparted to the test oil compositions used in the examples. Although use of tertiary amines of the foregoing general formula, in which $R^1$ and $R^2$ do not contain a sum of more than 6 carbon atoms, may in some cases be satisfactorily employed, in my practice of the present invention, I employ such tertiary amines in which $R^1$ and $R^2$ contain a sum of more than 6 carbon atoms as more effective demulsification characteristics are provided by the presence of the relatively high number of carbon atoms in the dialkyl grouping. Thus for example, I have found that under certain conditions, diisopropylaminomethyl cardanol, containing only 6 carbon atoms as a total of $R^1$ and $R^2$ of the foregoing general formula, is not as effective or consistent a demulsifier as are similar tertiary aralkyl alkyl amines, e. g., diamylaminomethyl cardanol, containing more than 6 carbon atoms in the corresponding dialkyl grouping.

In the foregoing description of my invention, the phenol grouping of the dialkylaminomethyl phenols contains at least one saturated or unsaturated hydrocarbon substituent as a replacement for a nuclear hydrogen atom. For example, diamylaminomethyl cardanol contains an unsaturated hydrocarbon chain as a substituent for a nuclear hydrogen atom. Although the present invention embodies the use of dialkylaminomethyl phenols having saturated or unsaturated hydrocarbon substituents linked to the phenol nucleus, nevertheless, I prefer to employ such phenols which contain at least one unsaturated hydrocarbon substituent as the presence of the unsaturated group provides improved solubility characteristics of the tertiary aralkyl alkyl amines in oils. Accordingly, preferred demulsifiers embodied by the present invention are illustrated by cardanol derivatives, e. g., dibutylaminomethyl cardanol, diamylaminomethyl cardanol, di-2-ethylhexylaminomethyl cardanol, dilaurylaminomethyl cardanol, and the like.

Although in the foregoing examples certain concentrations of the emulsification-suppressing agents have been set forth, I do not intend that my invention be limited thereto, as the amount of demulsifier used, based on the weight of oil, may be varied and yet provide effective demulsifying characteristics for oils containing polymerized esters of the acrylic series that induce emulsification of the oils. In general, the amount of demulsifier employed is dependent on several factors, as for example, the type of oil into which it is to be incorporated, the particular polymeric esters of the acrylic series in the oil, the solubility characteristics of the demulsifier in the oil composition, the degree of demulsification characteristics desired, and the like. For most purposes, however, use of demulsifier in amounts of about 0.01 to about 1.0%, based on the weight of oil, provides highly satisfactory results.

In practicing my invention, the demulsifiers may be added in desired amounts to oils, e. g., lubricating oils, hydraulic oils, and the like, that contain polymerized esters of the acrylic series which tend to induce emulsification of the oils. For such purposes, the demulsifiers may be employed per se, in mixtures thereof, or in combination with suitable vehicles as solutions or dispersions. For example, when it is desired to treat a lubricating oil, and it is further desired to add the demulsifying agent as a solution or dispersion, it is preferable that the solution or dispersion be prepared employing a vehicle that will not deleteriously affect the performance of the oil composition to which the demulsifier is to be added. Hence, particularly suitable vehicles for preparing solutions or dispersions of the demulsifiers embodied herein are mineral oils and fractions thereof, e. g., oils of lubricating grades.

Although the present invention embodies use of individual tertiary amines, as set forth hereinbefore, as emulsion-suppressing additives for oil compositions containing polymeric esters of the acrylic series, the invention also embodies the use of mixtures of such demulsifiers, as for some applications, mixtures thereof provide more effective demulsification characteristics than individual use of the components. Thus, for example, in some cases, demulsification efficiency is enhanced by employing a mixture of diamylaminomethyl cardanol and di-2-ethyl hexyl aminomethyl cardanol, the demulsification characteristics of such a mixture being superior to the efficiency obtained by using only one of these two components in concentrations equal to the sum of the components in the mixture. Still further, the demulsifiers of the present invention may be added to oils as solutions or mixtures with polymerized esters of the acrylic series. In this manner, oils may be treated to impart thereto the desired properties of the polymers of acrylic esters and at the same time, the emulsification-inducing characteristics of such polymers may be suppressed by the tertiary amines. A suitable method for preparing such a combination additive is to incorporate the demulsifier or demulsifiers and the polymerized ester or esters of the acrylic series in a suitable vehicle, e. g., mineral oil. More specifically and for further illustration, a combination additive may be prepared by adding diamylaminomethyl cardanol to a copolymer-containing oil composition as set forth in the foregoing examples, thus providing a substance containing diamylaminomethyl cardanol and a copolymer of a methacrylic acid ester dissolved in a mineral oil.

By the use of the term "consisting essentially" in the appended claims, it is not intended that the compositions defined therein be limited, as to content, to the ingredients specifically recited in the claims as it is within the scope of the present invention to embody compositions which, in addition to the specific ingredients recited, contain other substances for imparting certain desired properties to the mineral oil compositions. Thus, for example, compositions as embodied herein may contain in addition to the essential ingredients (mineral oil, polyacrylate and amine) other additives such as rust-inhibitors, oiliness agents, anti-oxidants, etc. However, in the use of such additional ingredients, the type and/or concentrations thereof employed should be such as not to deleteriously affect the ability of the defined emulsification-suppressing amines to perform their designated function when used in combination with a mineral oil containing a polyacrylate which induces emulsification. Hence, the use of the term "consisting essentially" has been employed with the intent that it does not exclude, from the claimed compositions, the presence of additional ingredients as aforediscussed.

Although the present invention has been described in conjunction with certain preferred embodiments thereof, those skilled in the art will readily recognize that variations and modifications can be made. Such variations and modifications are to be considered to be within the purview of the specification and the scope of the appended claims.

I claim:
1. A liquid lubricating composition consisting essentially of a mineral oil having dissolved therein (a) a polymerized ester in an amount sufficient to improve the viscosity index of said oil but having a tendency to cause emulsification, said polymerized ester having the formula:

$$CH_2=\overset{X}{\underset{|}{C}}-COOR$$

wherein X is a member from the group consisting of hydrogen and the methyl group and R represents a hydrocarbon group of 4 to 18 carbon atoms and (b) about 0.01 to about 1% by weight, sufficient to reduce substantially the increased emulsifying tendency imparted to said oil by said polymerized ester, of a substantially water-insoluble tertiary amine from the group consisting of oil-soluble trialkyl amines and oil-soluble amines of the following formula:

$$A-\overset{H}{\underset{H}{\overset{|}{C}}}-N\overset{R^1}{\underset{R^2}{\diagdown}}$$

wherein $R^1$ and $R^2$ are alkyl radicals containing a sum of more than six carbon atoms and A is a phenol having at least one nuclear hydrogen atom replaced by a hydrocarbon group.

2. A composition, as defined in claim 1, wherein A is a phenol having at least one nuclear hydrogen atom replaced by an aliphatic group.

3. A composition, as defined in claim 1, wherein the polymerized ester has the following formula:

$$CH_2=\overset{X}{\underset{|}{C}}-COOR$$

wherein X is a member from the group consisting of hydrogen and the methyl group and R represents a saturated hydrocarbon group of 4 to 18 carbon atoms.

4. A composition, as defined in claim 1, wherein the polymerized ester is a polymerized ester of alpha methacrylic acid.

5. A composition, as defined in claim 1, wherein the polymerized ester is a copolymer of an ester having the following formula:

$$CH_2=\overset{X}{\underset{|}{C}}-COOR$$

wherein X is a member from the group consisting of hydrogen and the methyl group and R represents a hydrocarbon group of 5 to 18 carbon atoms and an ester of the said formula wherein R is a hydrocarbon group of less than five carbon atoms.

6. A composition, as defined in claim 1, wherein A is a phenol having at least one nuclear hydrogen atom replaced by an unsaturated hydrocarbon chain.

7. A composition, as defined in claim 1, wherein the amine is a dialkylaminomethyl cardanol containing a sum of more than six carbon atoms in the dialkyl grouping.

8. A composition, as defined in claim 1, wherein the amine is diamylaminomethyl cardanol.

ANTHONY J. REVUKAS.

REFERENCES CITED

The following references are of record in the file of this patent:

UNITED STATES PATENTS

| Number | Name | Date |
|---|---|---|
| 2,340,036 | Zimmer | Jan. 25, 1944 |
| 2,388,057 | Herlocker | Oct. 30, 1945 |
| 2,407,954 | Fenske | Sept. 17, 1946 |
| 2,410,911 | Wasson | Nov. 12, 1946 |
| 2,413,972 | Herlocker | Jan. 7, 1947 |